Reissued Dec. 3, 1946

Re. 22,812

UNITED STATES PATENT OFFICE 22,812

PLASTICIZATION OF PLASTICS

John D. Jenkins, Milwaukee, Wis., assignor to Pittsburgh Plate Glass Company, Allegheny County, Pa., a corporation of Pennsylvania No Drawing. Original No. 2,385,920, dated October 2, 1945, Serial No. 423,624, December 19, 1941. Application for reissue September 27, 1946, Serial No. 699,646

9 Claims. (Cl. 117—161)

The present invention relates to the preparation and use of plastic compositions and notably to those containing compatible plasticizers.

One object of the invention is to provide a simple and economical process of uniformly dispersing compatible plasticizers with plastic materials in which they are employed as modifiers.

A second object of the invention is to provide a fluid composition comprising a high concentration of plastic material, and a plasticizer therefor suitable for spraying, brushing or like applications, without recourse to expensive solvents for the plastic.

These and other objects of the invention will be apparent from consideration of the following specification and the appended claims.

Plastics such as vinyl resins, cellulosic plastics and the like are customarily compounded with modifiers termed plasticizers, which enhance plasticity, toughness, flexibility and homogeneity. If the plastic is to be molded, sheeted, extruded, or otherwise shaped, the plasticizer may be incorporated by milling, which is a relatively laborious operation.

In the preparation of coating compositions suitable for spraying, brushing, dipping, or for application by other methods well understood by the art, it is customary to dissolve the resin plastic and such plasticizers as are required therefor in a suitable solvent in such proportions as to obtain a requisite fluidity of the composition. Upon application of the composition to the bodies to be coated, the solvents soon evaporate leaving the plastic, plasticizer and other modifiers as continuous adherent films. One objectionable feature of such process is that many of the desirable plastics are soluble only in certain relatively active solvents which can only be obtained at substantial expense.

Furthermore, plastics, in dissolving in solvents, tend to produce solutions of high viscosity and unless the concentration is kept low, the solutions may be so viscous as to make it difficult to apply them as films to bodies to be coated. Low concentration of plastic in the solvent necessitates use of excessive amounts of solvent and application of an undesirably large number of coats to obtain desired film thickness.

It has also been proposed to disperse solutions of resins with water or other non-solvent for the resins, to provide emulsions that can be suitably applied to a surface to be coated. The suspending medium and the solvent for the plastic evaporate from a film of such material and the particles of resin solution coalesce to form a solid, continuous film. Either process requires the use of solvents for the plastic.

In accordance with one feature of the present invention it is proposed to disperse a plastic material in finely-divided or powder form in an inexpensive medium which is a non-solvent therefor, and which contains in solution a plasticizer for the plastic, to provide concentrated suspensions that can be sprayed or brushed or otherwise applied to a body to be coated in much the same manner as ordinary coating materials, without recourse to solvents.

Any suitable finely-divided plastic material may be employed in practicing the invention. They include any of the usual synthetic or natural resins or plastics commonly used for molding or for forming coatings, which by themselves at ordinary temperatures may be obtained as non-tacky powders. Plastics considered to be especially suitable for the purpose included Vinylite X, a form of resin particularly designed for use in safety glass and considered to embody a polymerization product of polyvinyl alcohol and an aldehyde such as butyraldehyde, which polymerization is carried sufficiently far to obtain a product which is substantially insoluble in water, but is not conducted to the stage in which the resin loses its solubility in all solvents.

Another form of resin suitable for many purposes comprises the product sold under the trade name of "Vinylite H." This product is understood to comprise a copolymer of approximately 87% of vinyl chloride and 13% of vinyl acetate. If desired, the copolymer may be replaced by a simple polymer of either of its components, namely, of vinyl chloride or vinyl acetate.

Vinyl resins may be replaced by cellulosic plastics including cellulose acetate, cellulose ethers of the type of ethyl cellulose, cellulose aceto-propionate and cellulose acetobutyrate. Phenol resins, namely the polymerized products of phenol and formaldehyde, especially straight or unmodified phenolic resins in the intermediate or B stage of polymerization may be employed. Similarly, soluble urea resins obtained by condensing urea or thiourea and mixtures of urea and thiourea with formaldehydes, such as formaldehyde are contemplated. These resins may be modified by additions of certain amounts of alkyd resins obtained by condensing and polymerizing phthalic anhydride or other dicarboxylic acid with a polyhydroxy alcohol, such as glycerol. These alkyd resins may themselves include such modifiers as fatty acids, e. g, oleic acid, stearic acid, or glycerides, such as drying oils from linseed or the like source. The alkyd resins in general are relatively soft and soluble and constitute plasticizers for the other resins. Any other thermoplastic resin or plastic, that may be obtained in finely-divided, non-agglomerating solid form, may be employed.

The preparation of powders of the resins suitable for use in the practice of the invention may be effected by various methods. The most obvious method of course includes grinding or mechanical attrition. However, the material employed in the practice of the invention is reduced to a particle size of 200 mesh or less. The above method is not always satisfactory for producing such finely-divided materials, notably where the materials are relatively tough and rubbery plastics of the type of vinyl resins. Accordingly, it may be desirable in many instances to resort to precipitation of the plastic material from a solvent in order economically to obtain a pulverulent body suitable for dispersion, in accordance with the provisions of the present invention. One such process is disclosed in British Patent 498,396. This method involves projecting the resin while in solution as a very fine spray and precipitating the resin while the solution is still finely divided. Another method especially applicable to polyvinyl acetals is disclosed in British Patent 481,532, and involves dissolving the resin in a water immiscible solvent, such as chloroform or methylene chloride. This solution is then emulsified at high speed in water and in the presence of a dispersing agent such as sodium butyl naphthalene sulfonate. The solvent is removed by steam distillation. A further method is disclosed in German Patent 670,212 and involves dissolving the resin in a liquid under pressure, which liquid is gaseous at ordinary temperatures. Sulfur dioxide and methyl chloride are suggested for the purpose.

A preferred method for purposes of the present invention involves dissolving the plastic material, e. g., a polyvinyl acetal or a copolymer of vinyl acetate and vinyl chloride, vinyl acetate, methyl methacrylate, or the like in a solvent, adding a non-solvent to the solution approximately to the point of incipient precipitation of the plastic, and then cooling and agitating the solution in order to effect gelling, and subsequent separation of the plastic as a finely-divided solid which can be removed from the solvent by washing or other methods, to increase the concentration of non-solvent.

Examples of the method are as follows:

*Example A*

About 150 parts of the resin obtained by partial condensation of polyvinyl alcohol with butyraldehyde was dissolved in 850 parts of synthetic methanol. To this solution under agitation at room temperature was added 90 parts of water. The resin was partially precipitated during this addition but redissolved upon continued agitation to a clear fluid solution. The charge was continuously agitated and was gradually cooled. At 18° C. the charge became translucent and started gelling and at 5° C. the gel was quite heavy and viscous. Very strong agitation was required to keep the solution homogeneous at this point. At −3° C. some syneresis occurred and at −10° C. the gel began breaking and precipitation started. At −20° C. the resin had precipitated and the product was in fluid suspension. It was further cooled to −30° C. and an additional 2000 parts of water was added at this point to harden the resin. The mixture was poured into 3000 parts of water at room temperature and the product was isolated by filtration. It was dried in a current of air at 25° C. to yield a very light fluffy powder, 94.7% of which readily passed a 200 mesh sieve. Under the microscope the particle size appeared to be very uniform and in the neighborhood of 1000 mesh.

The filtered resin may be dried at any temperature below its softening point without serious coalescence of the resultant powder. A temperature of 45–50° C. has been found generally most satisfactory for polyvinyl acetal resins.

*Example B*

A solution was prepared by dissolving under agitation at room temperature, 100 parts of the resin obtained by copolymerizing, 87 parts of vinyl chloride and 13 parts of vinyl acetate in 900 parts of acetone. To this solution under agitation were added 320 parts of 88% isopropanol. Particles of resin precipitated during this addition but redissolved readily upon continued agitation. There resulted a slightly hazy but very fluid solution which was gradually cooled. At 5° C. the solution had become very hazy and quite viscous. At −4° C. the resin precipitated in very finely divided form to yield a fluid suspension. Cooling to −10° C. brought no further change in the appearance of the suspension.

An additional 700 parts of 88% isopropanol were added at −40° C. and immediately thereafter 1500 parts of water raising the temperature to −24° C. The charge was then dropped into 7000 parts of water at room temperature. After filtering and drying, less than 2% of the powder failed to pass a 200 mesh sieve.

*Example C*

Fifty parts of a commercial polymerized methacrylic resin known as "Acryloid BC–27" were dissolved in 450 parts of acetone. To this solution under agitation at room temperature were added 75 parts of water. The resulting clear solution was gradually cooled. At 9° C. it was viscous and haziness appeared. At 2° C. it was very hazy and viscous and required strong agitation to keep the mixture homogeneous. Between 0 and −5° C. the viscosity decreased very rapidly indicating that the gel had broken and the resin precipitated. At −8° C. an additional 500 parts of water were added after which the charge was dropped into 6000 parts of water at room temperature.

After mixing 1 hour the resin was filtered and was subsequently dried. It was then obtained as a fine powder the major portion of which readily passed a 200 mesh sieve.

*Example D*

A sample of polyvinyl alcohol was prepared by the hydrolysis of low viscosity polyvinyl acetate by the method described by Blaikie and Crozier, J. Ind. and Eng. Chem. 28 1158 (1936). According to this method 50 parts of the polyvinyl acetate known commercially as "Vinylite AYAA" were dissolved in 100 parts of synthetic methanol. A solution of 0.25 part of caustic potash in 10 parts of methanol was added. After several hours, the solution had set to a gel and after 18 hours, a rubbery gel remained covered by a clear mixture of methyl acetate and methanol. The solvent was decanted and the gel was dissolved in water. The resulting solution was held at 90–100° C. until the residual methanol and methyl acetate had been distilled. Additional water was then added so that the final concentration corresponded to the addition of 330 parts of water.

To this solution under agitation was added 330 parts of acetone by volume. It was then chilled gradually to −10° C. where it gelled. At −20°, the gel started synerizing and at −25° the gel was definitely broken and the product had precipitated. At −25 to −30° C. 1000 parts of acetone were added and the resulting suspension was allowed to warm to room temperature and was filtered. The filter cake was washed with 1000 parts of fresh acetone and was then dried in an oven at 65° C.

The product was thus obtained in dry lumps which were readily crushed under light pressure to a fine powder. All but 7% of the product readily passed a 200 mesh sieve.

*Example E*

Forty parts of a commercial resin obtained by polymerizing ethyl methacrylate were dissolved in a mixture consisting of 316 parts of 99.5% alcohol and 60 parts of acetone by volume. The solution was agitated at room temperature and there was added a solution consisting of 40 parts of water in 100 parts of alcohol. The solution became slightly cloudy but no precipitation occurred. It was then gradually cooled. At 15° C., the solution had become quite cloudy and 12° C. it began to gel. At 10° C. the gel started to break and at 5° C. the gel had broken and there was a very fluid suspension. The charge was cooled to −15° C. and was there diluted with 140 parts of water. It was then poured with 2500 parts of water to form a fine suspension.

The suspension was filtered and the cake was washed with water. It was then dried in an oven at 50° C. to form soft lumps which broke readily into a fluffy powder. Essentially all of the powder passed a 200 mesh sieve.

For purposes of forming suspensions of the plastic which suspensions embody a plasticizer for the final films or other bodies, the finely-divided plastic is incorporated with a liquid medium which is essentially non-solvent for the plastic, but which is a solvent for the plasticizer to be incorporated with the plastic. It will be apparent that if the precipitation method above described is employed to disperse or break up the plastic, the original precipitation or drowning medium may be employed as a medium for effecting the incorporation of the plasticizer. Thus in Example B, as above given, the plasticizer may be added to the resin suspended in finely-divided form in isopropanol.

A preferred method in many instances, however, involves removal of the precipitant by filtration, or filtration and evaporation and subsequent addition of an inexpensive organic non-solvent such as mineral spirits, petroleum ether or the like, which can be obtained at an expense of but a few cents a gallon. The plasticizer can then be added and soon dissolves in the non-solvent for the plastic.

Simultaneously any plasticizers, which are reasonably soluble in the non-solvent dispersing medium for the specific plastic contemplated, may be employed. A few suitable combinations of non-solvents and plasticizers for certain plastics are tabulated as follows:

| NITROCELLULOSE | |
|---|---|
| Non-solvent | Plasticizers |
| Mineral spirits<br>Butyl alcohol<br>Xylene<br>Toluene<br>Carbon tetrachloride, etc. | Glycol ether plasticizers<br>Monobutyl ether of ethylene glycol, phthalate<br>Dibutyl phthalate, etc.<br>Tricresyl phosphate<br>Castor oil |
| **CELLULOSE ACETATE** | |
| Mineral spirits<br>Carbon tetrachloride<br>Turpentine, etc. | Dimethyl phthalate<br>Phthalic acid ester of monomethyl ether of ethylene glycol, etc. |

| CELLULOSE ACETO-PROPIONATE or BUTYRATE | |
|---|---|
| Non-solvent | Plasticizers |
| Mineral spirits<br>Carbon tetrachloride<br>Xylol, etc. | Dimethyl phthalate<br>Phthalic acid ester of monomethyl ether of ethylene glycol, etc. |
| **ETHYL CELLULOSE** | |
| Paraffinic<br>Hydrocarbons e. g. gasolene, etc. | Dibutyl phthalate<br>Tricresyl phosphate<br>Triglycol dihexoate |
| **STRAIGHT PHENOLIC OR BAKELITE RESINS IN B STATE OF POLYMERIZATION** | |
| Mineral spirits<br>Petroleum naphtha | Vegetable oils<br>Dibutyl phthalate |
| **UREA-FORMALDEHYDE** | |
| Mineral spirits<br>Petroleum naphtha<br>Turpentine, etc. | Soft alkyd resins |
| **VINYL ACETATE POLYMER** | |
| Mineral spirits<br>Turpentine, etc. | Dibutyl phthalate<br>Tricresyl phosphate |
| **VINYL CHLORIDE** | |
| Mineral spirits<br>Turpentine, etc. | Dibutyl phthalate<br>Tricresyl phosphate |
| **PARTIAL POLY-VINYL ACETAL OR BUTYRAL** | |
| Petroleum naphtha<br>Hydrogenated naphtha<br>Cetane | Dibutyl phthalate<br>Triethylene glycol dihexoate |
| **COPOLYMER 87% VINYL CHLORIDE 13% VINYL ACETATE** | |
| Tetrahydro naphthalene<br>Dipentene, petroleum spirits, butyl alcohol<br>Propyl alcohol | Dibutyl phthalate<br>Tricresyl phosphate |
| **CHLORINATED RUBBER** | |
| Petroleum naphtha | Chlorinated diphenyl<br>Tricresyl phosphate |
| **METHYL METHACRYLATE RESIN** | |
| Mineral spirits | Dibutyl phthalate |
| **SHELLAC** | |
| Mineral spirits | Dibutyl phthalate |
| **MANILA GUM** | |
| Mineral spirits | Dibutyl phthalate |
| **STYRENE RESIN** | |
| Mineral spirits | Dibutyl phthalate |
| **COUMARONE—INDENE** | |
| Butanol | Linseed oil |

For most purposes, a range of non-solvents of about 30 to 90% with a preferred range of about 50 or 60% upon the basis of the complete formula is satisfactory, though for special purposes lower and higher proportions may be employed.

The plasticizers may be added in any amount less than that at which the resin tends strongly to gel in the non-solvent. For most purposes about 25 to 100%, based on plastic content is satisfactory.

Pigments such as carbon black, titanium dioxide, white lead and others may be added in appropriate amounts (2 to 300% more or less) based on plastic content of the formula. The pigments may be dispersed in the suspension or may be dispersed in the plastic or resin solutions prior to comminution of the resin.

It will be evident that mixtures, in practically any proportion, e. g. equal parts by weight of any two or more of the plastics herein disclosed, may be plasticized simultaneously, or two or more compatible pulverized and plasticized plastics may be admixed. Drying or semi-drying oils (soya bean, etc.) and resins may be added. Similarly compatible plasticizers may be admixed.

For example, suspensions of "Vinylite H," i. e. copolymer of vinyl chloride and vinyl acetate, may be modified with appropriate amounts (10 to 50%, more or less) of normal butyl methacrylate resin, Bakelite modified with ester gum, or simply with ester gum. Nitrocellulose may be modified with glycerol phthalates, ethyl cellulose, vinyl acetate, gum damar or ester gum modified phenolic resin. Ethyl cellulose may be modified with methyl acrylate resin, cellulose acetate, phenolic resin, coumar, damar, rosin, alkyd resins, etc.

The modifiers may be added to the base plastic at any time, e. g. before solution preparatory to precipitation of the powder, or to the solution, prior to precipitation. In some cases suspensions of the two plastics may be admixed or in event that the added resin is soluble in the non-solvent for the base resin, a suspension of the base resin in a solution of the added resin may be formed.

Alkyds, notably the soft, modified alkyds, may be dissolved in suspensions of vinyl acetals or vinyl acetate-vinyl chloride copolymers, in mineral spirits or other non-solvents. When the liquid evaporates the dissolved resin sets either as a binder about the particles of solid resin or forms a compatible mixture therewith. It is, of course, desirable that the proportion of dissolved resin be not so great as to induce gelation of the suspension. In most cases, 5 or 10%, based on total resin content or more can be added safely.

Solvents in limited amounts may be added to suspensions of plastics in non-solvents. A particularly interesting system involves a combination of a relatively volatile non-solvent and a solvent of lower volatility. As the non-solvent evaporates, the concentration of solvent increases to such extent that the plastic becomes so softened as to induce cohesion of the particles into a homogeneous mass. Subsequent fusion of films of such material by heat may not be required.

A typical system of this type would comprise a suspension of nitrocellulose plasticized with dibutyl phthalate and suspended in high test gasolene to which was added amyl acetate as a solvent for the nitrocellulose. A typical formula of this type might be approximately as follows:

*Example I*

| | Per cent |
|---|---|
| Nitrocellulose (powder) | 20 |
| Dibutyl phthalate | 10 |
| Suspension medium | 70 |

The suspension medium comprising:

| | Per cent |
|---|---|
| High test gasolene | 90 |
| Amyl acetate | 10 |

Examples in which the low volatility solvent is omitted are:

*Example II*

| | Per cent |
|---|---|
| Partial poly-vinyl butyral powder | 14 |
| Dibutyl phthalate | 6 |
| Titanium dioxide pigment | 20 |
| Petroleum spirits | 60 |
| | 100 |

*Example III*

| | Per cent |
|---|---|
| Partial polyvinyl butyral powder | 21 |
| Dibutyl phthalate | 9 |
| Petroleum spirits | 70 |

*Example IV*

| | Per cent |
|---|---|
| Partial polyvinyl butyral or acetal powder | 14 |
| Dibutyl phthalate | 6 |
| Carbon black | 3 |
| Petroleum spirits | 77 |

*Example V*

| | Per cent |
|---|---|
| Copolymer of vinyl chloride and acetate powder | 20 |
| Dibutyl phthalate | 7 |
| Tricresyl phosphate | 3 |
| Normal butyl methacrylate | 10 |
| Mineral spirits | 60 |

The suspension was sprayed on panels of steel and of glass and baked at 300 F. for 15 minutes. A good strongly adherent film resulted.

In Examples II and IV inclusive the pigments were ground into the suspension of plastic in non-solvent and plasticizer for a period of 24 hours. Dispersion was excellent. The dispersions were spread upon glass with a blade and dried. They could be baked at 100° C. for 1 hour to provide highly adherent homogeneous films.

*Example VI*

| | Per cent |
|---|---|
| Copolymer of vinyl acetate and vinyl chloride (powder) | 20 |
| Ethyl cellulose (powder) | 10 |
| Tricresyl phosphate | 7 |
| Dibutyl phthalate | 3 |
| Mineral spirits | 60 |
| | 100 |

The composition was applied by spray to metal panel and baked for 20 minutes at 150° C. to provide a hard and strongly adherent film.

In any of the examples as well as in other applications of the invention dispersing agents such as sulfonated castor oil or sodium salt of dibutyl naphthalene sulfonate in small percentages may be added to promote and maintain dispersion of the plastic particles.

It will be apparent that films after drying may be simply sprayed with a volatile solvent to provide homogeneous films. Objects coated with the dispersed plastics may be passed through chambers filled with solvent vapors or mists to produce softening. Thus films of the material in Examples I to VI, instead of being baked to induce plastic flow and coalescence of the particles, may be merely wet with acetone or other solvent or exposed to vapors thereof, or subjected to heat and/or pressure as by a roll.

Suspensions of partial polyvinyl acetal resin of the grade used in safety glass in mineral spirits and about 30% of a compatible plasticizer such as triglycol dihexoate may be spread upon glass plates and dried. The plates may then be superposed without cements and subjected to a temperature of 100° C. or upward and to direct fluid pressures of 10 or 15 atmospheres to cause them to adhere, thus providing safety glass of high strength.

Suspensions of plastics in solution of plasticizers in non-solvents for the resin, for instance those of Example III, or any of the plastics contemplated for suspension, may be spread upon the traveling surfaces of drums or bands of polished chromium or other stripping surfaces and baked to provide films that may be removed by stripping and used as a reinforcement for safety glass or for other purposes. Suspensions of resins without plasticizers may also be employed to form films.

Suspensions of the plastics may be added to paper pulp as a size or may be spread upon sheets of paper to give a surface finish.

*Example VII*

| | Per cent |
|---|---|
| Partial polyvinyl butyral resin (powder) | 21 |
| Dibutyl phthalate | 9 |
| Kerosene | 70 |

The suspension was spread with a blade upon a sheet of paper. The sheet was baked at 100° C. to evaporate the kerosene and to provide an adherent, water-resistant, low gloss coating excellently adapting the paper for use as a wrapping for food products, such as cheese and the like.

Cloth, such as cotton or linen or rayon, may be coated or sized with vinyl chloride acetate copolymer, vinyl acetal or other resin in similar manner, or fabrics may be dipped in a thin suspension and then wrung. Loosely woven fabrics such as are used as liners in collars or neckties may be permanently sized with a permanently thermoplastic resin of the type of partial polyvinyl acetal as described in Example VII, or of the copolymer of vinyl chloride and vinyl acetate as disclosed in Example V, to provide a product that will withstand repeated laundering and ironing and will bond the inner and outer layers together.

Suspensions, such as herein described, may be applied as coatings over films of regenerated cellulose, cellulose acetate, cellulose nitrate, casein, rubber hydrochloride and the like impermeable films, and the particles dried and coalesced by flash heating or by application of solvents or solvent vapors to increase resistance to moisture, solvent vapors, or to provide surfaces that can be united by heat or solvents to provide wrappers for food products or other merchandise. The suspensions should be made in non-solvents for the films to be coated.

In a further application of the invention, suspensions of plastics with or without fillers such as wood flour, paper pulp or the like in non-solvents as herein described may be applied to porous moulds of appropriate contour. The liquid medium is absorbed in, or drained out of the mould to leave films of resin that follow the contour of the mould. The resin may be consolidated by heat. The mould may be removed, or retained as a reinforcement in the finished body.

*Example VIII*

A mould may be formed of plaster of Paris or the like and filled or partially filled with a paste or slurry of a finely-divided, thermoplastic resin such as "Vinyl X" (partial polyvinyl butyral) in mineral spirits. A plasticizer such as dibutyl phthalate in appropriate amount, e. g., 20 or 30%, based on resin, fillers such as wood pulp in amounts of for example 40 or 60, based on total solids may be added. The slurry in proper amount is poured into the mould and let stand a few minutes. The excess is then poured off. The mould with the desired coating therein is left to stand for an hour or longer and the article in it is then sprayed with ethyl alcohol. After it has stood a further period of several hours the moulded article is removed and baked at 100° C. or thereabout to form a coherent homogeneous mass.

In order to provide an improved flatted varnish, resins, such as a "Vinylite X" or "Vinylite H" or ethyl cellulose in suspension in a no-solvent, as herein described, may be admixed with drying oils or other paint or varnish-forming material which is a non-solvent for the suspended plastic in amounts of about 1 to 20%, based on the total non-volatile content. Films of oils or varnishes so treated are of excellent, non-glossy appearance. They possess excellent strength and adhesion. They may be baked without loss of the flatting effect and are in other respects highly satisfactory. The suspensions of resins as herein described, for instance in Examples I to VI, are highly suitable for use as flatting agents in drying oils, either alone or when compounded with pigments, modifiers, etc.

For purposes of preparing a printing ink, a very finely-divided thermoplastic plastic, e. g., ethyl cellulose or the like, most of which will pass a screen of 200 to 1000 mesh, or even finer, is suspended, preferably along with a plasticizer, in a non-solvent for the plastic. Coloring matter, such as carbon black, dye, etc., may be incuded in amounts of 10% and upward, based upon plastic content. Drying oils, such as linseed, tung and the like may be included in amounts of 20% or more upon a like basis. The formulations given in Examples IV and VI, to which carbon black or other coloring matter in appropriate amount has been added may be employed. These inks, with enough non-solvent to give proper fluidity, are applied to paper, e. g., newspaper stock by conventional presses. The porous paper immediately absorbs much of the dispersing liquid, leaving the particles of plastic adhering to the paper in the desired pattern. The print is quickly passed over hot rolls or under radiant heaters to rapidly evaporate the solvents and to fuse down the plastic into adherent homogeneous state upon the paper. The paper may then be cooled by blasts of cold air or by passing it over cold rollers.

Drying of the film in printing is very rapid and at most requires but a few seconds. This is of great advantage in high speed printing because it admits of high production with relatively small drying apparatus. It also reduces blurring of print.

It is to be understood that webs of paper, cloth or other material, after printing, coating or impregnation, may be passed through chambers filled with vapors of a volatile solvent designed temporarily to soften the plastic to the point at which particles will cohere to each other and adhere to the paper.

In some instances the use of a plasticizer for resin is not required. For example, it may not always be required in the production of plastic suspensions suitable for use as printing inks, or as coatings for paper or cloth, or other surfaces; a suspension of finely-divided resin such as vinylite "X" or "H" in a volatile, plasticizer free, non-solvent for the resin may be applied to porous bodies or other surfaces and then freed of solvents and the resin sintered down to coherent state, by application of heat.

What I claim is:

1. A coating composition comprising a finely pulverulent thermoplastic organic plastic, a volatile liquid which is a non-solvent for the plastic in which the particles of the plastic are suspended and a permanent, compatible plasticizer for the plastic dissolved in said liquid, said plasticizer being present in substantial amount but less than an amount at which said plastic tends strongly to gel in said liquid non-solvent.

2. A coating composition as defined in claim 1 in which the plastic is a vinyl acetal.

3. A coating composition as defined in claim 1 in which the organic plastic is cellulosic.

4. A coating composition as defined in claim 1 in which the organic plastic is a polymer of a polymerizable vinylic compound.

5. A method of coating a surface which comprises applying thereto a film of a coating composition comprising a finely pulverulent thermoplastic organic plastic, a volatile liquid which is a non-solvent for the plastic in which the particles of the plastic are suspended and a permanent, compatible plasticizer for the plastic dissolved in said liquid, said plasticizer being present in substantial amount but less than an amount at which said plastic tends strongly to gel in said liquid non-solvent.

6. A method of coating a surface which comprises applying to the surface a film of a suspension of finely divided thermoplastic organic plastic material in suspension in an organic liquid medium which is a non-solvent for the plastic, said medium containing dissolved therein a compatible plasticizer for the plastic, the liquid medium being present in an amount within the range of 30 to 90 per cent based on the complete formula and the plasticizer being present in an amount within the range of 25 to 100 per cent based on the content of said organic plastic material therein.

7. A method as defined in claim 6 in which the liquid medium is present in an amount within the range of 50 to 60 per cent of the complete formula.

8. A method as defined in claim 6 in which the organic plastic material is cellulosic.

9. A method as defined in claim 6 in which the organic plastic material is a vinyl compound.

JOHN D. JENKINS.

Disclaimer

Re. No. 22,812.—*John D. Jenkins*, Milwaukee, Wis. PLASTICIZATION OF PLASTICS. Patent dated Dec. 3, 1946. Disclaimer filed Mar. 15, 1948, by the assignee, *Pittsburgh Plate Glass Company*.

Hereby disclaims all coating compositions covered by claims 1 to 4 inclusive of said patent except those in which the combination of pulverulent plastic and plasticizer, but for the presence of the non-solvent, would result in the gelling of the plastic particles to the point of coherence;

And disclaims all methods of coating covered by claim 5 except those involving the application of a film of a coating composition in which the combination of pulverulent plastic and plasticizer, but for the presence of the non-solvent, would result in the gelling of the plastic particles to the point of coherence;

And further disclaims all methods of coating covered by claims 6 to 9 inclusive except those involving the application of a film of a suspension in which the combination of finely divided plastic and plasticizer, but for the presence of the non-solvent, would result in the gelling of the plastic particles to the point of coherence.

[*Official Gazette April 13, 1948.*]